US008676982B2

(12) United States Patent
Lurie et al.

(10) Patent No.: US 8,676,982 B2
(45) Date of Patent: Mar. 18, 2014

(54) HOME NETWORK DOMAIN MASTER (75) Inventors: Aharona Lurie, Or Yehuda (IL); Avner Aloush, Netanya (IL)

(73) Assignee: Sigma Designs Israel S.D.I. Ltd., Tel Aviv (IL)

( * ) Notice: Subject to any disclaimer, the term of this patent is extended or adjusted under 35 U.S.C. 154(b) by 244 days.

(21) Appl. No.: 13/186,493

(22) Filed: Jul. 20, 2011

(65) Prior Publication Data
US 2012/0023237 A1    Jan. 26, 2012

Related U.S. Application Data (60) Provisional application No. 61/365,969, filed on Jul. 20, 2010.

(51) Int. Cl.
*G06F 15/173*    (2006.01)
(52) U.S. Cl.
USPC ............ 709/226; 709/223; 709/225; 709/245
(58) Field of Classification Search
USPC ................... 709/223–226, 245–256
See application file for complete search history.

(56) References Cited

U.S. PATENT DOCUMENTS

| 2009/0216889 | A1* | 8/2009 | Hadi | 709/246 |
|---|---|---|---|---|
| 2012/0026908 | A1* | 2/2012 | Tzannes et al. | 370/252 |
| 2012/0087229 | A1* | 4/2012 | Mantri | 370/201 |

FOREIGN PATENT DOCUMENTS

WO    2005015841    7/2011

OTHER PUBLICATIONS

U.S. Appl. No. 12/814,512, filed Dec. 16, 2010, Rami Verbin.
U.S. Appl. No. 11/218,708, filed Mar. 22, 2007, Ronald Bruce Sterenson.

* cited by examiner

*Primary Examiner* — Bharat N Barot
(74) *Attorney, Agent, or Firm* — Eitan, Mehulal & Sadot (57) ABSTRACT

A method of generating a transmission schedule for a network device of a home network includes ensuring that strongly interfering nodes of different domains do not transmit simultaneously while enabling other non interfering nodes of the different domains to transmit simultaneously. A domain master for a home network includes a receiver and a scheduler. The receiver receives at least one transmission from at least one node of its domain indicating at least one node of at least one neighboring domain whose transmissions are interfering. The scheduler schedules transmissions of said nodes of its domain in coordination with a domain master of said neighboring domain according to inter-domain node interference.

20 Claims, 5 Drawing Sheets

HOME NETWORK DOMAIN MASTER

CROSS-REFERENCE TO RELATED APPLICATIONS

This application claims benefit from U.S. Provisional Patent Application No. 61/365,969, filed Jul. 20, 2010, which is hereby incorporated by reference in its entirety.

FIELD OF THE INVENTION

The present invention relates to mitigation of neighboring interference in networks generally and to a signaling protocol for mitigation of interference from neighboring networks in particular.

BACKGROUND OF THE INVENTION

Neighboring networks (domains), in which signals are transmitted over shared media (such as powerline, coax, twisted pair etc), are known to be problematic due to interference from concurrently transmitting nodes within these domains whose signals may interfere with other nodes, not of their domain. Current solutions include having domain specific seeds for encoding the preambles of transmissions in one domain, using orthogonal preambles which encode the preambles using codes which are mathematically orthogonal to one another and thus, should not interfere with one another, and TDMA (Time Division Multiple Access) methods which allocate time slots or transmission opportunities (TXOPs) of a Medium Access Cycle (MAC) and which divide the MAC cycle among the interfering neighboring domains such that each domain receives only a portion of the MAC cycle.

SUMMARY OF THE INVENTION

There is therefore provided, in accordance with a preferred embodiment of the present invention, a domain master for a home network. The domain master includes a receiver and a scheduler. The receiver receives at least one transmission from at least one node of its domain indicating at least one node of at least one neighboring domain whose transmissions are interfering. The scheduler schedules transmissions of the nodes of its domain in coordination with a domain master of the neighboring domain according to inter-domain node interference.

Moreover, in accordance with a preferred embodiment of the present invention, the scheduler includes an interference evaluator to determine the level of interference, a planner to plan the transmissions according to the level of interference between nodes of two or more different domains and inter domain coordinator to communicate with the neighboring domain masters.

Additionally, in accordance with a preferred embodiment of the present invention, the scheduler includes a unit to instruct the nodes of its domain to periodically transmit a media access plan with default parameters to enable the detection of interfering nodes.

Further, in accordance with a preferred embodiment of the present invention, the scheduler includes a unit to produce a media access plan having zones allocated to nodes with allocations dependent on the level of interference between neighboring nodes. Each node includes a neighbor transmission detector which not only detects the media access plan with default parameters sent by its neighbors but all transmissions sent with default preambles.

Still further, in accordance with a preferred embodiment of the present invention, the planner includes an allocator to provide allocations to nodes with inter-domain node interference below a predefined level in at least one orthogonal preamble zone.

Moreover, in accordance with a preferred embodiment of the present invention, the planner includes an allocator to provide allocations to nodes with inter-domain node interference above a predefined level in protected zones of the media access plan separate from protected zones of media access plans allocated for interfering nodes of neighboring domains.

Further, in accordance with a preferred embodiment of the present invention, the inter domain coordinator includes unit to negotiate the locations of the protected zones with inter domain coordinators of the neighboring domains.

Still further, in accordance with a preferred embodiment of the present invention, the scheduler includes an aligner to align MAC cycles when the protected zones are needed.

Additionally, in accordance with a preferred embodiment of the present invention, the planner includes unit for allocating contention based transmission opportunities for coordinated domains in which transmissions are to be transmitted with a default preamble.

Moreover, in accordance with a preferred embodiment of the present invention, the scheduler also includes unit to release at least one transmission opportunity to the domain master of the neighboring domain if the traffic services required by the neighboring domain master are of higher priority.

There is also provided, in accordance with a preferred embodiment of the present invention, a method of generating a transmission schedule for a network device of a home network. The method includes receiving at least one transmission from at least one node of its domain indicating at least one node of at least one neighboring domain whose transmissions are interfering and scheduling nodes which experience strong interference from nodes of neighboring domains not to transmit simultaneous with the strongly interfering nodes while enabling other nodes to transmit simultaneously with other nodes of the other domains.

Moreover, in accordance with a preferred embodiment of the present invention, the method also includes evaluating interference to determine the level of interference; planning the transmissions according to the level of interference between nodes of two or more different domains and communicating between neighboring domain masters to coordinate the transmissions according to inter-domain node interference.

Further, in accordance with a preferred embodiment of the present invention, the method also includes instructing the nodes of its domain to periodically transmit a media access plan with default parameters to enable the detection of interfering nodes.

Still further, in accordance with a preferred embodiment of the present invention, the method also includes producing a media access plan having zones allocated to nodes with allocations dependent on the level of interference between neighboring nodes.

Additionally, in accordance with a preferred embodiment of the present invention, the method also includes providing allocations to nodes with inter-domain node interference below a predefined level in at least one orthogonal preamble zone.

Further, in accordance with a preferred embodiment of the present invention, the method also includes providing allocations to nodes with inter-domain node interference above a predefined level in protected zones of the media access plan separate from protected zones of media access plans allocated for interfering nodes of neighboring domains.

Moreover, in accordance with a preferred embodiment of the present invention, the method also includes negotiating the locations of the protected zones with inter domain coordinators of the neighboring domains.

Further, in accordance with a preferred embodiment of the present invention, the method also includes aligning MAC cycles when the protected zones are needed.

Still further, in accordance with a preferred embodiment of the present invention, the method also includes allocating contention based transmission opportunities of coordinated domains concurrently in which transmissions are to be transmitted with a default preamble.

Finally, in accordance with a preferred embodiment of the present invention, the method also includes releasing at least one transmission opportunity to the domain master of the neighboring domain if the traffic services required by the neighboring domain master are of higher priority.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It is often the case that within powerline networks a single signal within a domain can easily be picked up by nodes in neighboring domains. Applicant has realized that since not all nodes are exposed to interference from neighboring nodes, division of the MAC cycle by domain is neither necessary nor efficient. Therefore a solution is only required for those nodes with a high probability of interference with each other.

Figure 1:
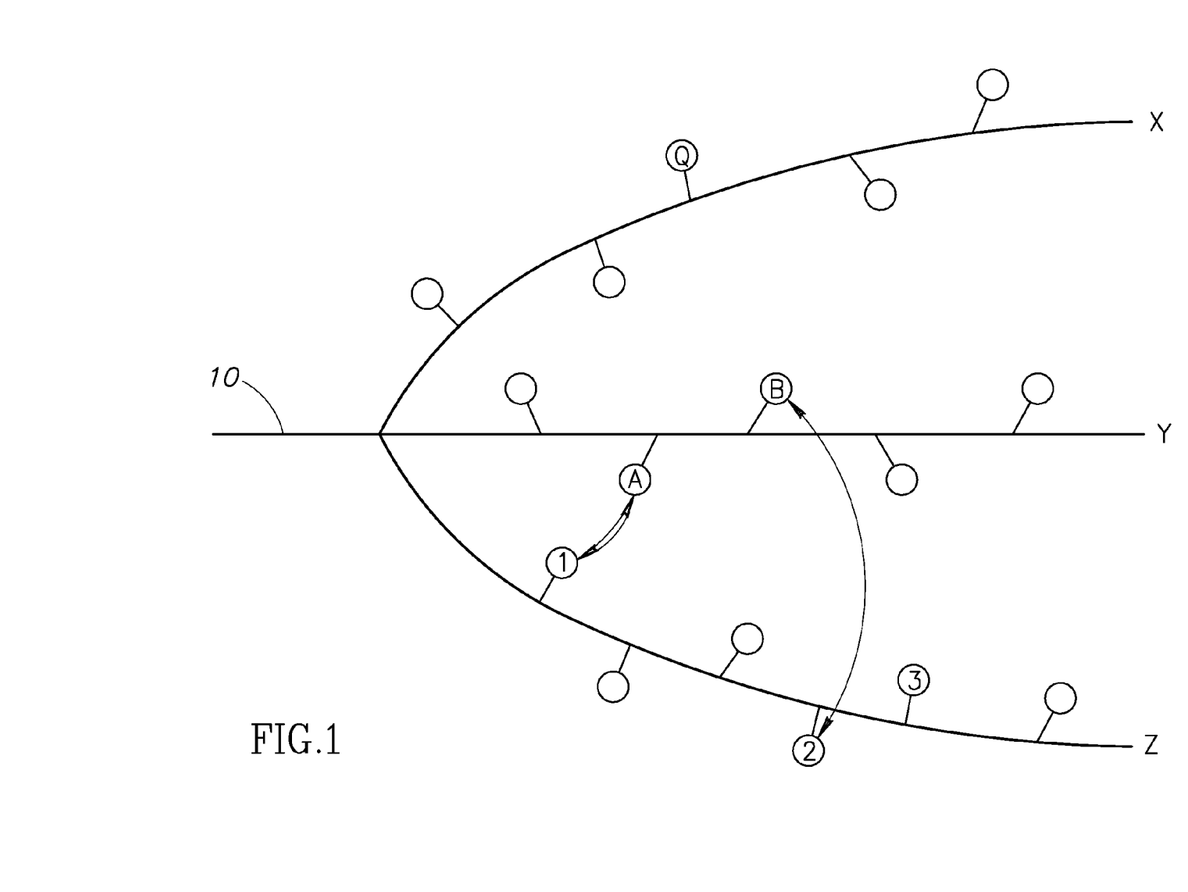
FIG. 1 is a schematic illustration of three neighboring domains transmitting over a powerline.

Reference is now made to FIG. 1 which illustrates three neighboring domains X, Y and Z all using the same power line 10, each comprising individual nodes. It will be appreciated that at peak user times, there may be some form of inter-domain node interference between node 2 (domain Z) and node B as (domain Y) as demonstrated by the single line. It will be further appreciated that there may be a higher level of inter-domain node interference between node 1 (domain Z) and node A (domain Y) as demonstrated by the double line, such as may be due to their close proximity. However, as Applicant has realized, the remaining nodes, such as node 3 (domain Z) and node Q (domain X), don't interfere with each other and can be allowed to transmit constantly and regularly, such as by using regular preambles.

Figure 2:
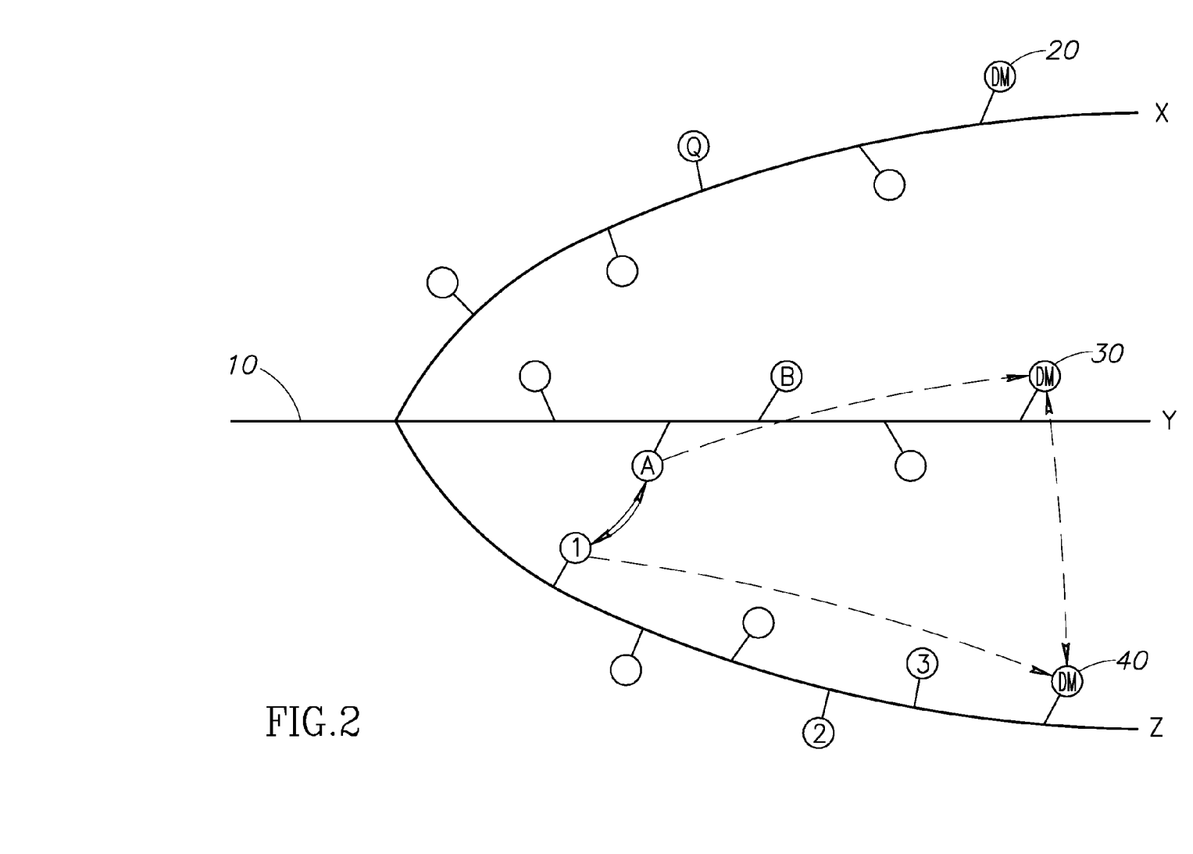
FIG. 2 is a schematic illustration of the three neighboring domains of FIG. 1 and the interference between nodes thereof.

In accordance with a preferred embodiment of the current invention, each domain may comprise a domain master 20, 30 or 40 as illustrated in FIG. 2. Domain masters 20, 30 and 40 may schedule transmissions for domains X, Y and Z, respectively, through advertisement of the schedule in a media access plan (MAP). In accordance with a preferred embodiment of the present invention, domain masters 20, 30 and 40 may not only schedule transmissions for their own domains but may also work together to schedule transmissions for nodes across each other's domains.

When a node detects neighbor interference, it may decode the source node, destination node and domain number of the interfering transmitter and may convey this information, as well as the strength of the interference, to its domain master as demonstrated by the dotted lines in the case of nodes 1 and A. Using this information, each domain master may work with its interfering neighbor domain masters to produce transmission schedules which enable all nodes to transmit without interference.

In a preferred embodiment of the current invention, domain master 30, for example, may distinguish between low and high interference caused by neighboring domain nodes through updated information reports from its domain nodes. When interference is low, domain master 30 may decide that it is sufficient to avoid detection of the preambles of the neighbor domain frames by using orthogonal preambles (i.e. preambles to transmissions which are designed not to interfere with each other). The domain master may allocate a dedicated transmission period for using orthogonal preambles for nodes that have low interference.

On the other hand, when interference is high, as illustrated in FIG. 1 by nodes 1 and A, domain master 30 may coordinate the media resources between interfering nodes 1 and A using a TDMA based technique, discussed in detail hereinbelow, together with domain master 40. The communication between the domain masters is performed in a special TXOP used for neighboring network coordination (NNTXOP) also discussed hereinbelow.

Figure 3:
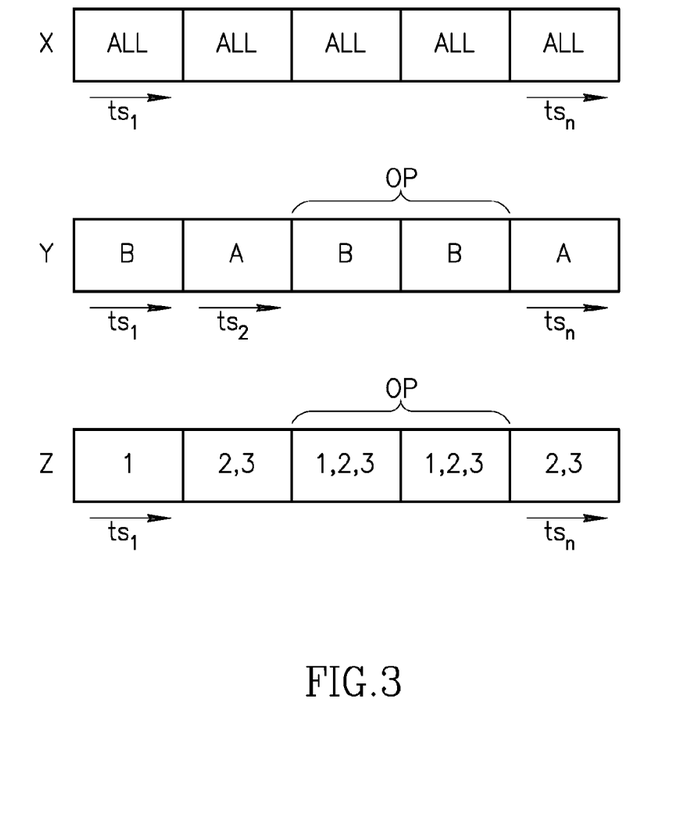
FIG. 3 is a schematic illustration of partial transmission schedules for domains X, Y and Z, for nodes which have low interference and for those which have high interference, respectively.

Reference is now made to FIG. 3 which illustrates partial transmission schedules for domains X, Y and Z which may be produced by domain masters 20, 30 and 40 to avoid interference. In accordance with a preferred embodiment of the present invention, since nodes 1 (domain Z) and A (domain Y) cannot transmit concurrently due to their high level of interference (as illustrated in FIG. 1), the domain masters may coordinate their transmission schedules to have separate, protected transmission zones for interfering nodes. Domain master 40 may instruct node 1 to transmit only during time slot $ts_1$ within a protected zone to allow node A (domain Y) to transmit during time slot $ts_2$, allocated to domain master 30. Since there is only high interference between nodes 1 and A, when node A is transmitting, other nodes from domain Y (such as 2 and 3) may transmit freely.

At the same time, for low interfering nodes, such as nodes 2 (domain Z) and B (domain Y), each domain master may instruct its low interfering nodes to use orthogonal preambles during their transmissions. Finally, for other nodes, such as node 3 (domain Z) and all nodes in domain X where no interference is expected, the domain masters may allow these nodes to transmit either using regular or orthogonal preambles according to the TXOP attributes along the entire MAC cycle. In these cases, for low or no interference, the domain masters may either allocate specific TXOPs, as in full TDMA, or may define a section of the MAC cycle in which transmissions may be done using collision avoidance/carrier sensing media access (CA/CSMA) methods of any type. For example, one type may be that disclosed in U.S. patent application Ser. No. 11/218,708 entitled 'Collision Avoidance Media Access Method for Shared Networks', filed Sep. 6, 2005 and assigned to the common assignee of the present invention, which application is incorporated herein by reference. The method disclosed in the application employs a media access plan (MAP) having sub-burst slots. Each sub-burst slot has a very short duration (e.g., 8-32 μsecs), is associated with a particular one or group of network participants, and represents an opportunity for the initiation of a data transmission by its associated network participants. When a participant utilizes a sub-burst slot allocated to it, the participant expands the slot until the transmission ends or the section of the MAC cycle has ended.

In order to enable one domain to study its neighbor's domain (e.g. its MAC cycle duration and start time, the location of its NNTXOP, etc.), each domain master may periodically transmit a default MAP, known as MAP-D, described in detail in U.S. Ser. No. 12/814,512, filed Jun. 14, 2010, assigned to the common assignee of the present invention and incorporated herein by reference. Each domain master may also periodically and randomly instruct all nodes in its domain to repeat the MAP-D. MAP-D is a MAP sent with default PHY parameters so all nodes in all domains are able to receive it. MAP-Ds are transmitted (by the domain master and by any node that repeats it) using default preambles so their signals may be interpreted by other nodes.

Each node has a neighbor transmission detector that detects not only the MAP-Ds sent by its neighbors but all transmissions performed with the default preamble.

Figure 4:
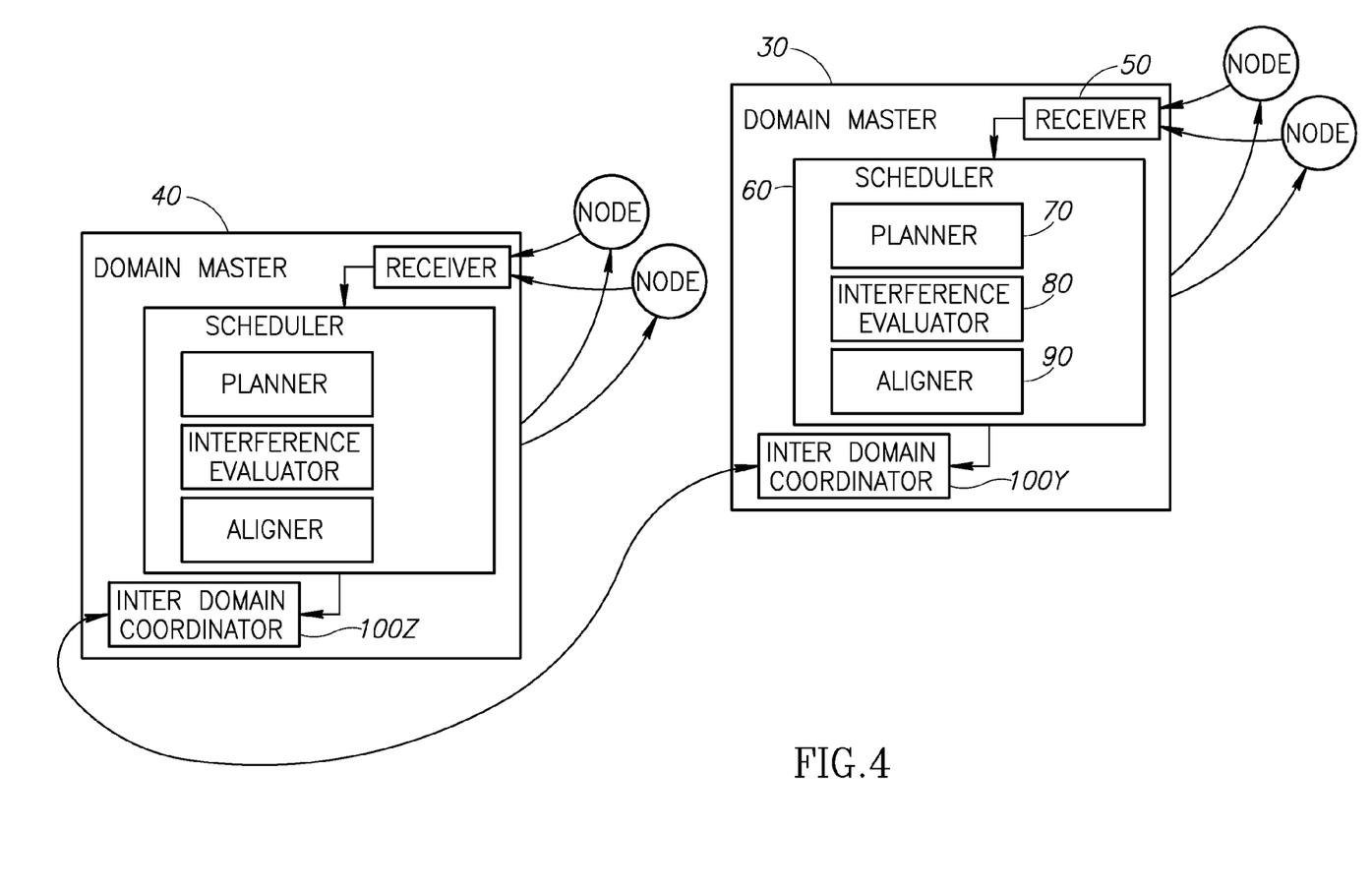
FIG. 4 is a schematic illustration of a domain master.

Reference is now made to FIG. 4 which details domain masters 30 and 40 and their inter domain communication. Each domain master may comprise a receiver 50, a scheduler 60, a planner 70, an interference evaluator 80, an aligner 90 and an inter domain coordinator 100. Receiver 50 may receive information from one of the nodes of the domain when the node detects or receives a MAP-D of a neighboring node with a signal level that is higher than a predefined level (such as node 1 (domain Z)). Interference evaluator 80 may then determine the level of interference detected (low vs. high as defined by a threshold). Scheduler 60 may then start TDMA-based NN (neighboring network) coordination and may indicate to inter domain coordinator 100 to inform the inter domain coordinator 100 of the other domain master, such as domain master 40, that protected zones are required for the strongly interfering nodes.

According to the information interpreted by interference evaluator 80, aligner 90 may determine which MAC cycles from which domains need to be aligned, as described in more detail hereinbelow. Once the MAC cycles have been aligned, planner 60 may generate the MAP for the upcoming MAC cycle using the information of interference evaluator 80 about which nodes have which levels of interference.

Figure 5A:
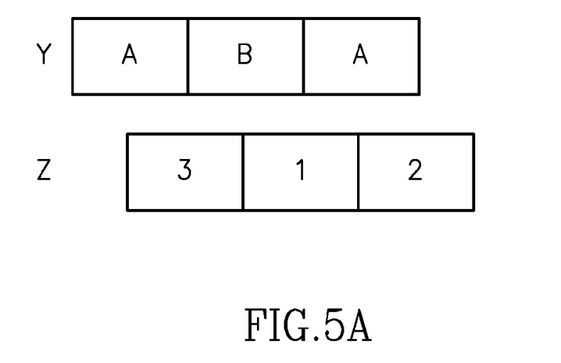
FIGS. 5A and 5B are schematic illustrations of the alignment of transmission schedules for domains Y and Z.
Figure 5B:
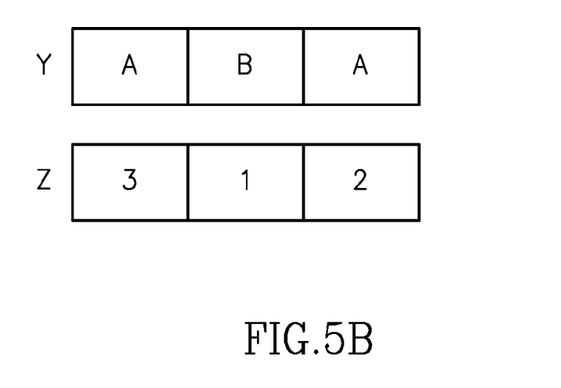

Reference is now made to FIGS. 5A and 5B. FIG. 5A illustrates the MAC cycles of domains Z and Y before alignment. At this point, there is no coordination between the domains and domain masters 30 and 40 may instruct their nodes to transmit according to their separate MAPs. Therefore there is a high probability of neighboring nodes transmitting concurrently and thus, possibly interfering with each other.

Reference is now made to FIG. 5B where domain master 30 may align its MAC cycle offset to the MAC cycle offset of domain master 40 using information received from the MAP of domain master 40. Thus, in FIG. 5B, the first time slot for node A becomes aligned with the time slot for node 3 as are all the other time slots.

The alignment process uses the fact that the domain master (or the MAP repeater) stamps each MAP with its current time, known as NTR (Network Time Reference). Each node in the domain is synchronized with its domain master time, by adjusting its local time with the domain master time according to the NTR in the MAPs. When a node decodes a MAP from a neighboring domain, the node can decode the current time in the neighbor domain of sending the MAP, via the NTR specified in the neighbor's MAP, hence it can calculate the offset from its own local time to get the neighbor MAC cycle start time within the timing of its own domain. Accordingly, the reception time (RXtime) of the neighbor's MAP (which is in the local node time) minus the NTR in the neighbor MAP is the offset that has to be added/subtracted from the MAC cycle start (CYCSTART) specified in the neighbor MAP to know where the neighbor MAC cycle will start in terms of the local time at the node.

In mathematical terms:

$$\text{Neighbor MAC cycle start} = RX\text{time of neighbor MAP} + \text{neighbor CYSTART} - \text{neighbor NTR}$$

As mentioned hereinbelow, inter domain coordinator 100Y may request protected zones from inter domain coordinator 100Z during the MAC cycle to enable strongly interfering nodes, such as nodes 1 and A, to communicate (transmit or receive) without collisions. This way, domain master 40 may schedule nodes that are not interfering to transmit during these requested protected zones.

Alternatively, the domain masters may use silent TXOPs, where no node is allowed to transmit. This method allows allocation of silent TXOPs only when it is really necessary (i.e. no non-interfering nodes can be assigned for transmission there).

Domain master 40 may reply to the protected bandwidth request from domain master 30 with a confirmation message that specifies the confirmed protected zones and may suggest other positions for the denied protected zones. In addition, based on information about priority levels of the traffic transmitted by its nodes, domain master 40 may be forced to release some of its TXOPs to free time for domain master 30 in case the traffic services required by domain master 30 are of higher priority.

When a new domain is initiated and it detects neighboring domains with high interference, it may coordinate with them by MAC cycle alignment, NNTXOP allocation and requesting a protected TXOP zone for its MAP.

Contention based transmission opportunities (CBTXOPs) of coordinated domains may also be allocated concurrently to use carrier sense multiple access (CSMA) bandwidth sharing by using the default preamble in such TXOPs.

It will be appreciated that in general, for multiple domains such as is illustrated in FIG. 1, the domain master which is coordinated with the least number of neighboring domains may start the coordination procedure. If both domains are coordinated with the same number of domains, the domain that contains the least number of detected interfering nodes may start the coordination procedure.

As soon as an interfering node (such as node A (domain Y)) which is transmitting in a protected TXOP has finished its transmissions, domain master 30 may inform domain master 40 that transmission has ended in order to release bandwidth for other nodes to transmit.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories. (EEPROMs), magnetic or optical cards, Flash memory, or any other type of media suitable for storing electronic instructions and capable of being coupled to a computer system bus.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A domain master for a home network comprising:
   a receiver to receive at least one transmission from at least one node of its domain indicative of at least one node of at least one neighboring domain whose transmissions are interfering;
   a scheduler to schedule transmissions of said at least one node of its domain in coordination with domain masters of said neighboring domains to prevent said at least one node of its domain from transmitting simultaneously with said at least one node of said at least one neighboring domain when interference from said at least one node of said at least one neighboring domain exceeds a threshold while allowing said at least one node of its domain to transmit simultaneously with other nodes of said at least one neighboring domain.

2. A domain master according to claim 1 wherein said scheduler comprises
   an interference evaluator to determine a level of said interference;
   a planner to plan said transmissions of said at least one node of its domain according to said level of said interference; and
   interdomain coordinator to communicate with said neighboring domain masters.

3. A domain master according to claim 1 wherein said scheduler comprises means to instruct nodes of its domain to periodically transmit a media access plan with default parameters to enable neighboring domains nodes the detection of interfering nodes.

4. A domain master according to claim 2 wherein said scheduler comprises means to produce a media access plan having zones allocated to nodes with allocations dependent on said level of said interference between neighboring nodes.

5. A domain master according to claim 2 wherein said planner comprises an allocator to provide allocations to nodes experiencing interference from interfering nodes of neighboring domains below said threshold in at least one orthogonal preamble TXOP zone.

6. A domain master according to claim 2 wherein said planner comprises an allocator to provide allocations to nodes experiencing interference from interfering nodes of neighboring domains above said threshold in protected TXOP zones of said media access plan separate from protected TXOP zones of media access plans allocated for said interfering nodes of said neighboring domains.

7. A domain master according to claim 6 wherein said inter domain coordinator comprises means to negotiate the locations of said protected TXOP zones with inter domain coordinators of said neighboring domains masters, wherein said negotiate comprises at least sending a request and receiving a confirmation of said request.

8. A domain master according to claim 1 wherein said scheduler comprises an aligner to align MAC cycles between its domain and said neighboring domains when said protected TXOP zones are needed.

9. A domain master according to claim 2 wherein said planner also comprises means for allocating contention based TXOPs for coordinated domains in which transmissions are to be transmitted with a default preamble.

10. A domain master according to claim 7 and wherein said scheduler also comprises means to release at least one TXOP within said protected TXOP zone to said domain master of said neighboring domain responsive to said negotiating if the traffic services required by said neighboring domain master for the time allocated for said TXOP are of higher priority.

11. A method of generating a transmission schedule for a network device of a home network, the method comprising:
    a domain master receiving at least one transmission from at least one node of its domain indicative of at least one node of at least one neighboring domain whose transmissions are interfering; and
    said domain master scheduling transmissions of said at least one node of its domain in coordination with domain masters of said neighboring domains to prevent said at least one node of its domain from transmitting simultaneously with said at least one node of said at least one neighboring domain when interference from said at least one node of said at least one neighboring domain exceeds a threshold while allowing said at least one node of its domain to transmit simultaneously with other nodes of said at least one neighboring domain.

12. A method according to claim 11 and also comprising:
    said domain master determining a level of said interference;
    said domain master planning said transmissions of said at least one node of its domain according to said level of said interference; and
    said domain master communicating with neighboring domain masters to coordinate said transmissions according to said level of said interference.

13. A method according to claim 11 and also comprising said domain master instructing said nodes of its domain to periodically transmit a media access plan with default parameters to enable neighboring domains nodes the detection of interfering nodes.

14. A method according to claim 12 and also comprising said domain master producing a media access plan having zones allocated to nodes with allocations dependent on said level of said interference between neighboring nodes.

15. A method according to claim 11 also comprising said domain master providing allocations to nodes experiencing interference from interfering nodes of neighboring domains below said threshold in at least one orthogonal preamble TXOP zone.

16. A method according to claim 11 also comprising said domain master providing allocations to nodes experiencing interference from interfering nodes of neighboring domains above said threshold in protected TXOP zones of said media access plan separate from protected TXOP zones of media access plans allocated for said interfering nodes of said neighboring domains.

17. A method according to claim 16 also comprising said domain master negotiating the locations of said protected TXOP zones with inter domain coordinators of said neighboring domains masters, wherein said negotiating comprises at least sending a request and receiving a confirmation of said request.

18. A method according to claim 11 also comprising said domain master aligning MAC cycles between its domain and said neighboring domains when said protected TXOP zones are needed.

19. A method according to claim 11 also comprising said domain master allocating contention based TXOPs of coordinated domains concurrently in which transmissions are to be transmitted with a default preamble.

20. A method according to claim 17 and also comprising said domain master releasing at least one TXOP within said protected TXOP zone to said domain master of said neighboring domain responsive to said negotiating if the traffic services required by said neighboring domain master for the time allocated for said TXOP are of higher priority.

* * * * *